US00RE34524E

United States Patent [19]

Diller, deceased et al.

[11] E Patent Number: Re. 34,524

[45] Reissued Date of Patent: Jan. 25, 1994

[54] POLYIMIDE COATING COMPOSITIONS BASED ON META-DIALKYLDIHYDROGEN PYROMELLITATE AND AROMATIC DIAMINES

[75] Inventors: Richard D. Diller, deceased, late of Gilroy, Calif., by Marilyn J. Diller, legal representative; Anthony F. Arnold, Poughkeepsie, N.Y.; Ying Y. Cheng, San Jose, Calif.; Patricia M. Cotts, Menlo Park, Calif.; Donald C. Hofer, San Martin, Calif.; Mahmoud M. Khojasteh, Wappingers Falls, N.Y.; Elwood H. Macy, Hughsonville, N.Y.; Prabodh R. Shah, Wappingers Falls, N.Y.; Willi Volksen, San Jose, Calif.

[73] Assignee: International Business Machines Corporation, Armonk, N.Y.

[21] Appl. No.: 733,049

[22] Filed: Jul. 18, 1991

Related U.S. Patent Documents

Reissue of:

[64] Patent No.: 4,849,501
Issued: Jul. 18, 1989
Appl. No.: 183,123
Filed: Apr. 19, 1988

[51] Int. Cl.[5] ..... C08G 69/26

[52] U.S. Cl. ..... 528/353; 528/351; 524/252; 427/385.5

[58] Field of Search ..... 528/353, 351; 524/252; 427/385.5

[56] References Cited

U.S. PATENT DOCUMENTS

| | | | |
|---|---|---|---|
| 2,880,230 | 3/1959 | Edwards | 560/76 |
| 4,533,574 | 8/1985 | Fryd et al. | 427/385.5 |
| 4,562,100 | 12/1985 | Fryd et al. | 427/385.5 |

*Primary Examiner*—John Kight, III
*Assistant Examiner*—P. Hampton-Hightower
*Attorney, Agent, or Firm*—Dale M. Crockatt

[57] ABSTRACT

A composition for the application of a planar polymide coating having a glass transition temperature above 300° C. comprises a solution in an anhydrous, aprotic solvent of *the reaction product* of an aromatic diamine and a [dialkyldihydrogen] *dialkyl* pyromellitate *diacyl chloride* which [is more than] *comprises about* 90% *or more* meta isomer.

8 Claims, No Drawings

POLYIMIDE COATING COMPOSITIONS BASED ON META-DIALKYLDIHYDROGEN PYROMELLITATE AND AROMATIC DIAMINES

Matter enclosed in heavy brackets [ ] appears in the original patent but forms no part of this reissue specification; matter printed in italics indicates the additions made by reissue.

TECHNICAL FIELD

The present invention is concerned with compositions useful for forming planar polyimide coatings having glass transition temperatures over 300° C.

BACKGROUND ART

U.S. Pat. Nos. 4,533,574 and 4,562,100 both show polyimide coating compositions from esterified anhydrides and aromatic amine mixtures. Both patents, however, (see col. 3, lines 43–55) specifically say that for their purposes, aromatic dianhydrides, such as pyromellitic dianhydride, are not generally suitable. The patents both teach that it is desirable that the diamines have amine groups in the meta position relative to each other (see col. 2, line 20).

U.S. Pat. No. 2,880,230 is concerned with diamine salts of pyromellitic acid diester. The patent teaches at col. 2, lines 54–59 that in the preparation of salts to be used for the preparation of polyimides, the mixture of acid diester isomers may be used as the acidic component or that either isomer may be isolated from the mixture and used alone, but that there is no particular advantage in so doing if polymer-grade intermediates are used.

DISCLOSURE OF THE INVENTION

It has now been found that greatly improved polyimide coating compositions can be based on meta-dialkyldihydrogen pyromellitate and aromatic diamines. High solid content meta-polyamic alkyl ester formulations for thick film (greater than 4 μm) packaging applications with enhanced global planarization and increased solution stability are realized by this approach.

The present invention differs radically from the prior art in that it employs the meta isomer of a dialkyldihydrogen pyromellitate rather than the mixture of para and meta isomers which has been employed by the prior art. The present invention thus goes directly against the teaching of the prior art, since U.S. Pat. No. 2,880,230 specifically teaches that the individual isomer is no better than the mixture of isomers and U.S. Pat. Nos. 4,533,574 and 4,562,100 each specifically teach that esters of pyromellitic acid are not suited for use in their invention. It should, however, be emphasized that the object of the present invention differs from the objects of the referenced prior art. Unlike the prior art, the present invention is attempting to obtain polyimides particularly suitable for application as thick films (thicker than 4 μm) and having glass transition temperatures over 300° C. A further and unexpected improvement obtained with the polyimides of the present invention is that they are unusually ductile. Elongation-to-break measurements of about 130% have been obtained repeatedly, in contrast to elongation of from about 40 to 50% with the equally mixed isomer polymer.

When dialkyldihydrogen pyromellitates are formed, for example by the esterification of the anhydride, a 50—50 mixture of the para and the meta isomers is obtained. This mixture can be readily separated into its individual components by suspending the mixture in ethyl acetate, heating it to reflux with mechanical stirring. Following stirring and cooling, the insoluble material is filtered. The insoluble fraction is extremely high in the para fraction, while the soluble fraction is very high in the meta fraction. For purposes of the present invention the dialkyldihydrogen pyromellitate should be more than 90% the meta isomer.

In another embodiment, the hot refluxed solution is filtered without any cooling. The insoluble material on the filter is very rich in the para isomer. The filtrate contains about 90% meta isomer. Upon cooling crystals of almost pure meta isomer precipitate (98% purity, for example) and may be collected by simple cold filtration. The liquor from this latter filtration contains about 20% para isomer and process impurities.

The purified meta isomer of the dialkyldihydrogen pyromellitate can be reacted with a chlorinating agent such as oxalyl chloride or thionyl chloride to form the corresponding acyl chloride which can then be reacted with an aromatic diamine to form a polyamic alkyl ester, which can be formulated at concentrations above 30% by weight with relatively high solution stability. For example, such solutions decrease in viscosity about 5% during a period of 3 to 4 weeks at 25° C. After such a period the viscosity rises slowly. This increased solution stability is illustrated in the following table which records phase separation data. The outstanding comparative improvement recorded for Sample #1 was only obtained by using high meta isomer concentrations. Specifically, we have found that a copolymer containing 80% meta isomer showed no significant improvement over equal weight isomer copolymers, whereas copolymers containing 90% or more of the metal isomer display the substantial improvements claimed herein, and at the same time may be produced practically. It will be appreciated that the polymer properties change with composition in a continuous way, so that the invention is not limited to a maximum of 10.0% para isomer. Such a 10% figure, is rather, a useful guide for the manufacture and use of a consistent product. In the table, NMP refers to the solvent N-methyl pyrrolidone.

Solution stabilities of various isomeric compositions.

TABLE 1

Solution stabilities of various isomeric compositions.

| | Isomer Ratio (Meta/Para) | Stability |
|---|---|---|
| Sample #1 (35 wt % in NMP) | 100/0 | Solution clear @ −20° C. |
| Sample #2 (15 wt % in NMP) | 0/100 | Precipitated @ 25° C. after 16 hours |
| Sample #3 (22 wt % in NMP) | 37/63 | Precipitated @ 25° C. after 4 days |
| Sample #4 (22 wt % in NMP) | 48/52 | Precipitated @ −4° C. after 10 days |

Particularly in reference to Sample 190 4, it should be noted that while it is not necessary to store copolymers below freezing temperatures, many solutions of the composition of the invention have not separated when frozen. The best stability in such polymers has been obtained when a solution addition of acyl chloride was used for polymerization. Even in these best cases, however, measuring the rate of change of viscosity at 25° C., the 20% solutions of mixed isomer polymer drifted 10% in viscosity twice as quickly as 30% solutions of polymers of selected metal isomer.

In addition to improved solubility as well as solution stability, the meta-polyamic alkyl ester formulations also revealed very improved planarization and gap filling characteristics.

The meta-polyamic alkyl esters exhibited imidization characteristics similar to the isomeric, polyamic alkyl esters and analysis of their mechanical properties upon imidization revealed similar values as those obtained for the polyimides derived from isomeric polyamic alkyl ester and polyamic acids. However, the process of the present invention yields films which can be extended by 90% before breaking, while the mixed isomer material can be extended by only 40%.

In summary, the present invention provides a greatly improved method of forming solution-stable, high solid content coatings that allow the formation of thick films with greatly improved global planarization, greatly improved gap filling characteristics and high glass transition temperatures.

The following examples are given solely for purposes of illustration and are not to be considered limitations of the present invention, many variations of which are possible without departing from the spirit and scope thereof.

840 gm of diethyl dihydrogen pyromellitate was suspended in 2.1 liters of ethyl acetate and heated to reflux with mechanical stirring. The mixture was then allowed to cool to room temperature and stirring was continued for 12 hours. The insoluble material was filtered and the filtrate evaporated at ~50° C. under reduced pressure. The two fractions were then dried in vacuo at 50° C., for 24 hours.

| | | |
|---|---|---|
| Yield: | ~380 g (insoluble fraction) | meta/para = 6/94% |
| | ~430 g (soluble fraction) | meta/para = 93/7% |

6.0 Kg of diethyl dihydrogen pyromellitate was mixed with 8.0 Kg ethyl acetate and stirred at 79° C. in a closed reactor until a uniform fine suspension resulted. The suspension was forced through a 0.45 micron filter using nitrogen pressure and the filtrate was collected and chilled. A white crystalline mass formed in the filtrate which was filtered on a Buchner funnel. Yield, the original insoluble fraction 2.7 Kg 100% para isomer. The crystalline solid from the soluble fraction after chilling was 1.5 Kg 97% meta isomer. The final filtrate contained 1.5 Kg meta and 0.3 Kg para isomers.

Poly[oxy-di-aniline-4,6-diethoxycarboxy isophthalamide]

24.30 gm (0.070 mole) of 4,6-diethoxycarboxy isophthaloyl chloride was slowly added to a solution of 14.30 gm (0.714 mole) of p,p'oxydianiline and 14.5 gm (0.143 mole) of N-methylmorpholine dissolved in 250 nl of dry N-methypyrrolidone in a 500 ml three-necked flask equipped with a mechanical stirrer, argon inlet, and gas bubbler. The reaction mixture was maintained at ~5° C. via an ice-water bath throughout the aryl chloride addition. The mixture was then stirred overnight, while being allowed to reach ambient temperature. The polymerization mixture was then coagulated in a large excess of distilled water, filtered, and washed with copious amounts of distilled water, than ethanol, and finally ethyl acetate. The polymer was then dried in vacuo at 50° C. for at least 24 hours, resulting in a light yellow powder in nearly quantitative yield.

Poly[p-phenylene-4,6-diethoxycarboxy isophthalamide]

4.58 gm (0.0424 mole) of p-phenylene diamine was dissolved in 150 cc of dry N-methyl pyrrolidone in a 500 ml three-necked flask equipped with a mechanical stirrer, argon inlet, and gas bubbler. When diamine dissolution was complete, the polymerization mixture was cooled to ~5° C. via an ice-water bath and 14.42 gm (0.0415 mole) of 4,6-diethoxycarboxy isophthaloyl chloride was gradually added. After aryl chloride addition was complete, 9.5 gm (0.093 mole) of N-methylmorpholine was added and the polymerization was then stirred overnight while being allowed to reach ambient temperature. The polymer work-up was identical to the preceding example.

When used to form coatings, the [polyimides] *polyimide precursors* of the present invention should be in an aprotic solvent in which the [polyamine] *polyimide* precursors become converted to polyimide by dehydration. Suitable aprotic solvents include, for example, dimethylacetamide, dimethyl sulfoxide and dimethylformamide. The preferred solution is N-methyl pyrrolidone, most particularly in a 90–10% mixture with N-cyclohexylpyrrolidone. The solvent should be substantially anhydrous.

We claim:

1. A composition for applying to a substrate a planar polyimide coating having a glass transition temperature over 300° C., said composition comprising a solution, in anhydrous, aprotic solvent, of *the reaction product of* an aromatic diamine and a [dialkyldihydrogen] *dialkyl* pyromellitate *diacyl chloride* which [is more than] *comprises about* 90% *or more* meta isomer.

2. A composition as claimed in claim 1 wherein the [dialkyldihydrogen] *dialkyl* pyromellitate *diacyl chloride* is the diethyl compound.

3. A composition as claimed in claim 1 wherein the aromatic diamine is p-phenylene diamine or 4,4'-diaminodiphenylether.

4. A composition as claimed in claim 1 wherein the solvent is N-methyl pyrrolidone.

5. A composition as claimed in claim 4 wherein the solvent also contains about 10% of N-cyclohexyl pyrrolidone.

*6. A polyimide coating precursor comprising a polyisophthalamide polymer which is the reaction product of an aromatic diamine and an alkyl pyromellitate diacyl chloride which comprises about 90% or ore meta isomer.*

*7. The precursor as claimed in claim 6 wherein the dialkylpyromellitate diacyl chloride is the diethyl compound.*

*8. The precursor as claimed in claim 6 wherein the aromatic diamine is p-phenylene diamine or 4,4'-diaminodiphenylether.*

* * * * *